C. C. CRAWFORD.
AUXILIARY CARRIER FOR AUTOMOBILES.
APPLICATION FILED JUNE 23, 1917.
1,249,338.
Patented Dec. 11, 1917.
2 SHEETS—SHEET 1.
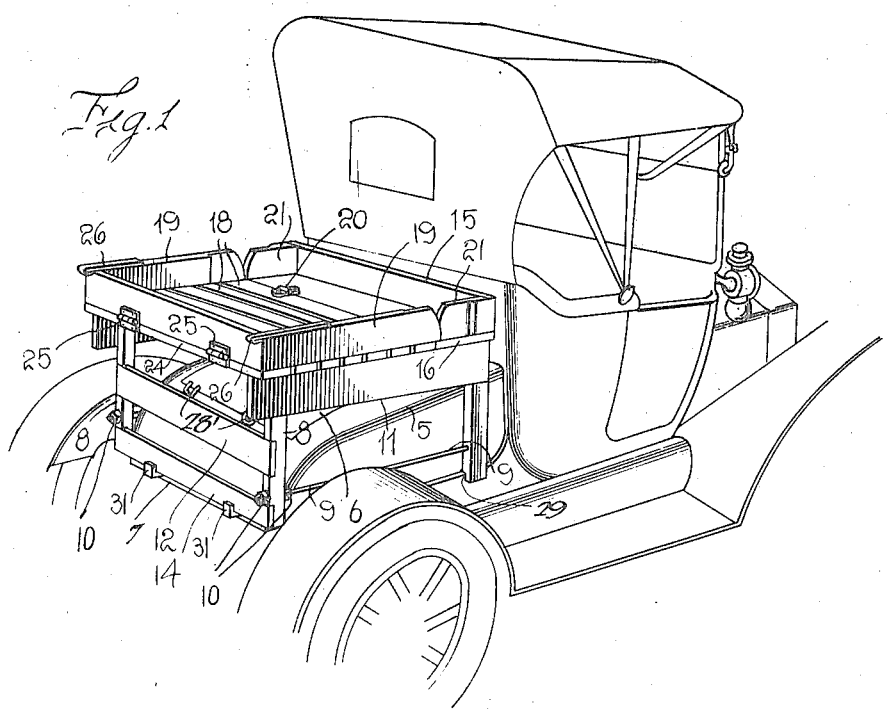
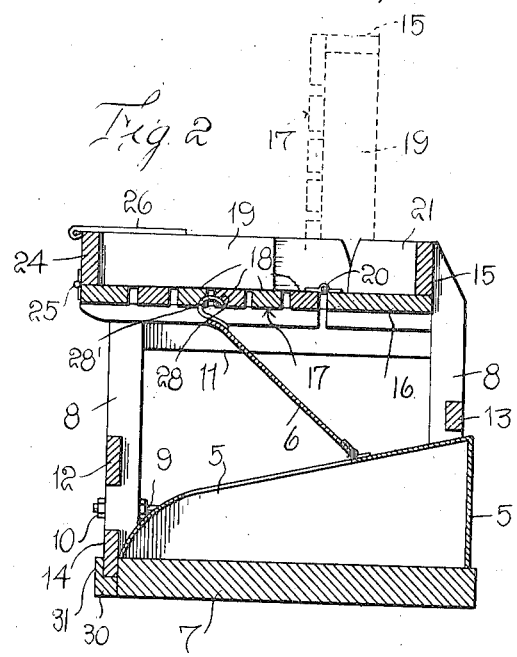
Inventor
C. C. CRAWFORD
By Watson E. Coleman
Attorney C. C. CRAWFORD.
AUXILIARY CARRIER FOR AUTOMOBILES.
APPLICATION FILED JUNE 23, 1917.
1,249,338.
Patented Dec. 11, 1917.
2 SHEETS—SHEET 2.
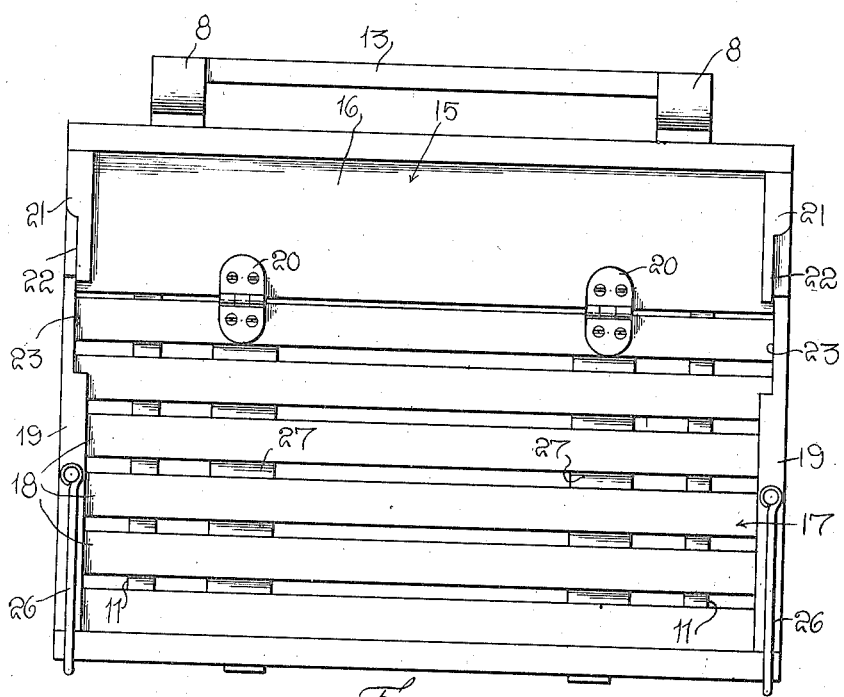
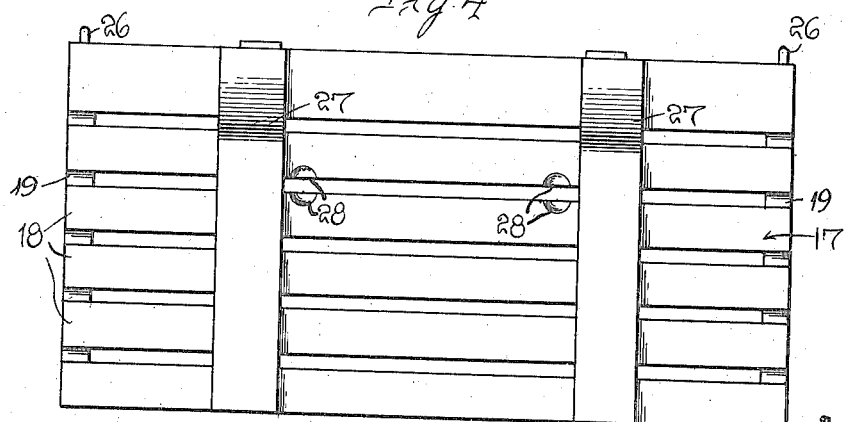
Inventor
C. C. CRAWFORD
By Watson E. Coleman
Attorney

UNITED STATES PATENT OFFICE.

CHARLES C. CRAWFORD, OF WAYSIDE, OKLAHOMA.

AUXILIARY CARRIER FOR AUTOMOBILES.

1,249,338.          Specification of Letters Patent.          Patented Dec. 11, 1917.

Application filed June 23, 1917. Serial No. 176,619.

*To all whom it may concern:*

Be it known that I, CHARLES C. CRAWFORD, a citizen of the United States, residing at Wayside, in the county of Washington and State of Oklahoma, have invented certain new and useful Improvements in Auxiliary Carriers for Automobiles, of which the following is a specification, reference being had to the accompanying drawings.

This invention relates to auxiliary carriers for automobiles, and has for its primary object to provide a very simply constructed and serviceable device which may be readily mounted upon the rear end of the vehicle frame without necessitating any material alterations therein.

The invention has for another important object to provide a device of the above character which is so constructed and arranged that access may be readily had to the interior of the luggage or equipment compartment with which the machine body is provided.

It is also a further detail object of my invention to provide an auxiliary article carrier for vehicles embodying a frame adapted to extend above the turtle shell back or rear portion of the vehicle body, and an article receiving tray secured upon said frame and including a hinged section which may be readily lifted when it is desired to obtain access to the interior of the turtle shell.

It is also a further general object of my invention to improve and simplify the construction of auxiliary carriers of the above character, whereby the same may be produced at comparatively small manufacturing cost, and can be applied to various types of motor vehicles without necessitating the services of a skilled mechanic.

With the above and other objects in view, my invention consists in the novel features of construction, combination, and arrangement of parts to be hereinafter more fully described, claimed, and illustrated in the accompanying drawings, in which, Figure 1 is a perspective view showing one embodiment of my improved auxiliary carrier applied to a well known type of automobile;

Fig. 2 is a vertical longitudinal sectional view, the cover of the turtle shell compartment being raised, and also showing the hinged section of the tray in dotted lines in its raised position;

Fig. 3 is a top plan view; and

Fig. 4 is a bottom plan view of the hinged section of the tray.

Referring in detail to the drawings, 5 designates the wall of the compartment at the rear end of the vehicle body which, in a certain make of automobile, is commonly termed a turtle shell. The top wall of this compartment is provided with an opening normally closed by a hinged lid or cover 6. 7 designates the frame of the machine, upon which the turtle shell is suitably secured.

My improved auxiliary article carrier includes a frame, the spaced side uprights 8 of which are connected adjacent their lower ends by rods 9 extending through openings in the uprights. Nuts 10 are threaded upon the ends of the rod against the opposite faces of the uprights. These uprights are also connected to each other at their upper ends by the bars 11, and the front and rear uprights are connected to each other by the transverse brace bars 12 and 13 respectively, said front uprights 8 being additionally connected at their lower ends by a transverse bar 14. The front uprights 8 extend above the bars 11 and, to the same, the vertical transverse wall of the relatively narrow tray section 15 is fixed, the base 16 of this tray section being suitably secured upon the bars 11. 17 designates a relatively wide tray section preferably having a plurality of spaced parallel base bars 18 which are connected and rigidly held together by the vertical sideboards 19. This tray section 17 is connected to the rear edge of the base of the fixed tray section 15 by means of spaced hinges indicated at 20. The vertical sideboards 21 of the fixed section of the tray have their outer faces cut away or recessed, as at 22, and the opposed ends of the sideboards 19 of the hinged tray section are similarly recessed, as at 23, on their inner faces. Thus, when the tray section 17 is raised, the forward ends of the sideboards 19 will lap upon the outer sides of the sideboards 21 of the fixed tray section. The rear end of the movable tray section 17 is provided with an end gate 24 hinged to the base of said tray section at its lower edge, as shown at 25. Resilient latch rods 26 are fixed at one of their ends to the upper edges of the sideboards 19 and at their free ends are adapted to engage over the upper edge of the end gate to hold the latter in its closed position.

Spaced reinforcing cleats 27 are also secured to the under sides of the base bars 18 of the tray section 17, and between these cleats one of said bars 18 is provided in one edge with the spaced notches indicated at 28. The free end of the cover 6 of the turtle shell 5 is provided with spaced, resilient lugs 28' to engage in these notches and hold the turtle shell cover in its raised position as shown in Fig. 2 of the drawings.

The lower ends of the uprights 8 are notched, as at 29, for engagement upon the outer upper sides of the longitudinal bars of the frame 7 and thereby prevent any transverse shifting movement or displacement of the auxiliary carrier. To the rear transverse bar of the frame at spaced points, the lugs 30 are fixed, said lugs having upwardly projecting lips or flanges 31 spaced from the frame bar. Between these flanges and the frame bar, the lower transverse brace bar 14 of the tray supporting frame is adapted to be engaged. Thus, the auxiliary carrier attachment may be easily and quickly applied to the frame of the machine above the turtle shell compartment with which the machine is equipped, and without necessitating the manipulation of bolts, nuts, or other securing devices.

From the foregoing description, taken in connection with the accompanying drawings, the construction, manner of application, and several advantages of the device will be clearly and fully understood. When the hinged section of the carrier tray is in its normal horizontal position, the articles may be retained therein when the end gate is closed, as the ends of the sideboards 19 lap slightly upon the opposed ends of the sideboards 21 of the stationary tray section, whereby possible loss of small articles is obviated. The rear brace bar 12 is disposed at a sufficient distance below the under side of the tray so as to permit the cover of the turtle shell to be easily raised and latched in its open position so that access may be had to the compartment of the vehicle body when the tray of the auxiliary carrier is filled with merchandise. When this tray is empty, it may be raised to the dotted line position seen in Fig. 2, while the body compartment is being filled. My improved auxiliary carrier as a whole is very simple and durable in its construction and while, as herein shown, it is designed for application to a particular make of automobile, it will be apparent that by resorting to slight mechanical changes, the device may also be adapted to various other makes of vehicles. It is also to be further understood that while I have herein shown and described the preferred construction and relative arrangement of the several parts, the same are nevertheless susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. The combination with a vehicle frame and an article receiving compartment thereon, of an auxiliary article carrier including a frame, an article receiving tray disposed above and in spaced relation to said compartment, said tray including a hinged section adapted to be raised to afford access to said compartment, and means for removably supporting the frame of the auxiliary carrier upon the vehicle frame.

2. The combination with a vehicle frame and an article receiving compartment thereon having a hinged lid, of an auxiliary article carrier including a frame, a tray supported by said frame above the compartment, and latch lugs on the cover of the compartment to engage means on the tray and sustain said cover in open position.

3. The combination with a vehicle frame and an article receiving compartment thereon having a hinged cover, of an auxiliary article carrier including a frame, a tray on said frame having a hinged section adapted to be raised to afford access to said compartment, latch devices on the free end of the cover to engage the under side of the hinged section of the tray and sustain the cover in its open position, and means for removably supporting the frame of the auxiliary carrier upon the vehicle frame.

4. The combination with a vehicle frame and an article receiving compartment thereon, of an auxiliary carrier including spaced side frame uprights and brace rods connecting the same, the lower ends of said uprights being notched for engagement upon the upper edges of the vehicle frame bars, a brace bar connecting the corresponding side uprights to each other, lugs secured to the rear transverse bar of the vehicle frame and having upwardly projecting flanges, said brace bar being adapted for engagement upon the lugs between the flanges thereof and the vehicle frame to removably support the frame of the auxiliary carrier in open position, and an article receiving tray on the upper end of said frame disposed above and in spaced relation to said compartment.

In testimony whereof I hereunto affix my signature in the presence of two witnesses.

CHARLES C. CRAWFORD.

Witnesses:
K. L. EDENS,
H. D. CANNON.